(12) United States Patent
Guede et al.

(10) Patent No.: US 11,075,965 B2
(45) Date of Patent: Jul. 27, 2021

(54) METHOD AND APPARATUS FOR DETECTING PACKET LOSS IN STAGGERCASTING

(71) Applicant: INTERDIGITAL MADISON PATENT HOLDINGS, SAS, Paris (FR)

(72) Inventors: Celine Guede, Cesson Sevigne (FR); Joan Llach Pinsach, Cesson-Sevigne (FR); Loic Fontaine, Noyal-sur-Vilaine (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 15/387,611

(22) Filed: Dec. 21, 2016

(65) Prior Publication Data
US 2017/0180437 A1    Jun. 22, 2017

(30) Foreign Application Priority Data
Dec. 21, 2015  (EP) ..................... 15307072

(51) Int. Cl.
*H04L 29/06* (2006.01)
*H04L 1/02* (2006.01)
*H04L 1/00* (2006.01)
*H04L 1/20* (2006.01)
*H04L 12/26* (2006.01)
(Continued)

(52) U.S. Cl.
CPC ........ *H04L 65/4076* (2013.01); *H04L 1/0045* (2013.01); *H04L 1/02* (2013.01); *H04L 1/20* (2013.01); *H04L 43/0829* (2013.01); *H04L 65/4015* (2013.01); *H04L 65/80* (2013.01); *H04W 24/08* (2013.01); *H04L 47/283* (2013.01); *H04L 65/608* (2013.01)

(58) Field of Classification Search
CPC ............ H04L 65/4076; H04L 43/0829; H04L 63/0485; H04L 47/10; H04L 1/0045; H04L 65/4015; H04L 1/02; H04L 1/20; H04W 24/08; H04N 21/2343; H04N 21/2365; H04N 21/238
See application file for complete search history.

(56) References Cited

U.S. PATENT DOCUMENTS 5,790,543 A * 8/1998 Cloutier ............. H04N 21/4305
                                                         370/252
6,781,983 B1 * 8/2004 Armistead .......... H04L 12/5692
                                                         370/352
(Continued)

FOREIGN PATENT DOCUMENTS

CN          1291034 A      4/2001
CN        101999235 A      3/2011
(Continued)

*Primary Examiner* — Melanie Jagannathan
(74) *Attorney, Agent, or Firm* — Volpe Koenig (57) ABSTRACT

In a staggercasting system, a receiver estimates a delivery time of a packet from a main stream and, if the packet from the main stream is not received at the estimated delivery time, the receiver substitutes a corresponding packet from the stagger stream. As a result, a loss can be detected quicker since the receiver does not have to wait until detection of a missing sequence number and, therefore, the receiver can accommodate the time of presentation such that the user does not suffer a loss in quality of service.

20 Claims, 11 Drawing Sheets

(51) Int. Cl.
*H04W 24/08* (2009.01)
*H04L 12/841* (2013.01)

(56) References Cited

U.S. PATENT DOCUMENTS

| | | | |
|---|---|---|---|
| 7,079,486 B2 * | 7/2006 | Colavito | H04L 12/6418 370/231 |
| 8,059,711 B2 | 11/2011 | Ramasinamy et al. | |
| 8,750,385 B2 | 6/2014 | Dai et al. | |
| 9,264,332 B2 | 2/2016 | Sakurai et al. | |
| 9,706,232 B2 | 7/2017 | Shang | |
| 2005/0182833 A1 * | 8/2005 | Duffle, III | H04L 47/10 709/224 |
| 2006/0034338 A1 * | 2/2006 | Degenhardt | H04L 29/06027 370/516 |
| 2006/0117360 A1 * | 6/2006 | Cooper | H04N 21/4349 725/100 |
| 2008/0008096 A1 | 1/2008 | Dhanapal et al. | |
| 2008/0030623 A1 | 2/2008 | Ramaswamy et al. | |
| 2008/0056131 A1 * | 3/2008 | Balakrishnan | H04L 41/142 370/232 |
| 2008/0117930 A1 * | 5/2008 | Chakareski | H04L 47/10 370/465 |
| 2008/0232243 A1 | 9/2008 | Oren et al. | |
| 2010/0150249 A1 * | 6/2010 | Campana | H04L 1/0041 375/240.25 |
| 2010/0278042 A1 * | 11/2010 | Monnes | H04L 43/0894 370/230 |
| 2011/0029684 A1 | 2/2011 | Campana et al. | |
| 2011/0283156 A1 | 11/2011 | Hiie | |
| 2013/0070581 A1 * | 3/2013 | Clark | H04L 69/28 370/216 |
| 2013/0185451 A1 | 7/2013 | Gelter | |
| 2014/0219284 A1 * | 8/2014 | Chau | H04L 12/2867 370/394 |
| 2016/0337091 A1 * | 11/2016 | Kim | H04L 47/26 |
| 2017/0180437 A1 * | 6/2017 | Guede | H04L 1/02 |
| 2017/0187637 A1 * | 6/2017 | Underwood | H04L 43/1621 |

FOREIGN PATENT DOCUMENTS

| | | |
|---|---|---|
| CN | 102884746 A | 1/2013 |
| CN | 103458268 A | 12/2013 |
| CN | 103636169 A | 3/2014 |
| CN | 104065994 A | 9/2014 |
| EP | 2299636 | 3/2011 |
| WO | WO2009032106 | 3/2009 |
| WO | WO2009126253 | 10/2009 |
| WO | WO2010014239 | 2/2010 |

* cited by examiner

FIG. 1

*Prior Art*

FIG. 2

*Prior Art*

FIG. 3

Prior Art

FIG. 4

*Prior Art*

FIG. 5

*Prior Art*

METHOD AND APPARATUS FOR DETECTING PACKET LOSS IN STAGGERCASTING

REFERENCE TO RELATED EUROPEAN APPLICATION

This application claims priority from European Application No. 15307072.7, entitled "Method and Apparatus for Detecting Packet Loss In Staggercasting," filed on Dec. 21, 2015, the contents of which are hereby incorporated by reference in its entirety.

BACKGROUND OF THE INVENTION

The present invention generally relates to communications systems and, more particularly, to wireless and wired systems, e.g., terrestrial broadcast, cellular, Wireless-Fidelity (Wi-Fi), satellite, cable, etc.

Figure 1:
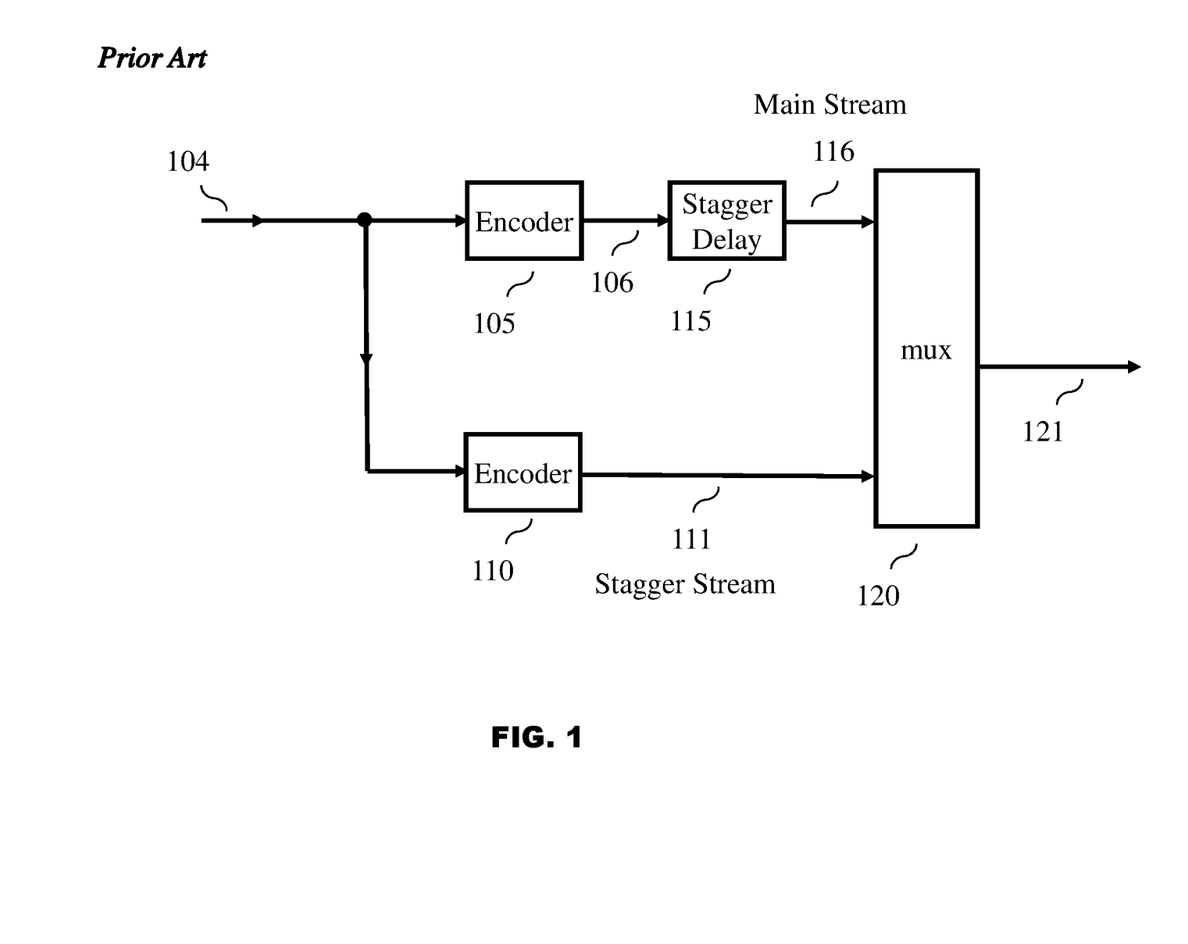
FIG. 1 illustrates a prior art transmitter for use in a staggercast system.

In staggercasting, a stream, e.g., of packets, is sent twice—as a main stream and as a stagger stream. The stagger stream is sent in advance compared to the main stream, i.e., the main stream is delayed (the stagger delay). An illustrative staggercasting transmitter is shown in FIG. 1. The elements shown in the figure are well-known and will not be described in detail. In FIG. 1, a staggercast transmitter illustratively comprises encoders 105 and 110, stagger delay 115 and multiplexer (mux) 120. A signal 104 is applied to encoders 105 and 110, which encode the signal to provide encoded signals 106 and 111, respectively. Encoded signal 111 is also stagger stream 111. For illustration purposes, these encoders perform the same type of encoding, although this is not required. Encoded signal 106 is then delayed in time by stagger delay 115 to provide main stream 116. This delay can be adjustable or fixed. As a result of being delayed, the stagger stream is now "in advance" of the main stream. Mux 120 multiplexes the main stream and the stagger stream to provide output stream 121 for transmission (broadcast), i.e., the transmitted stream.

Figure 2:
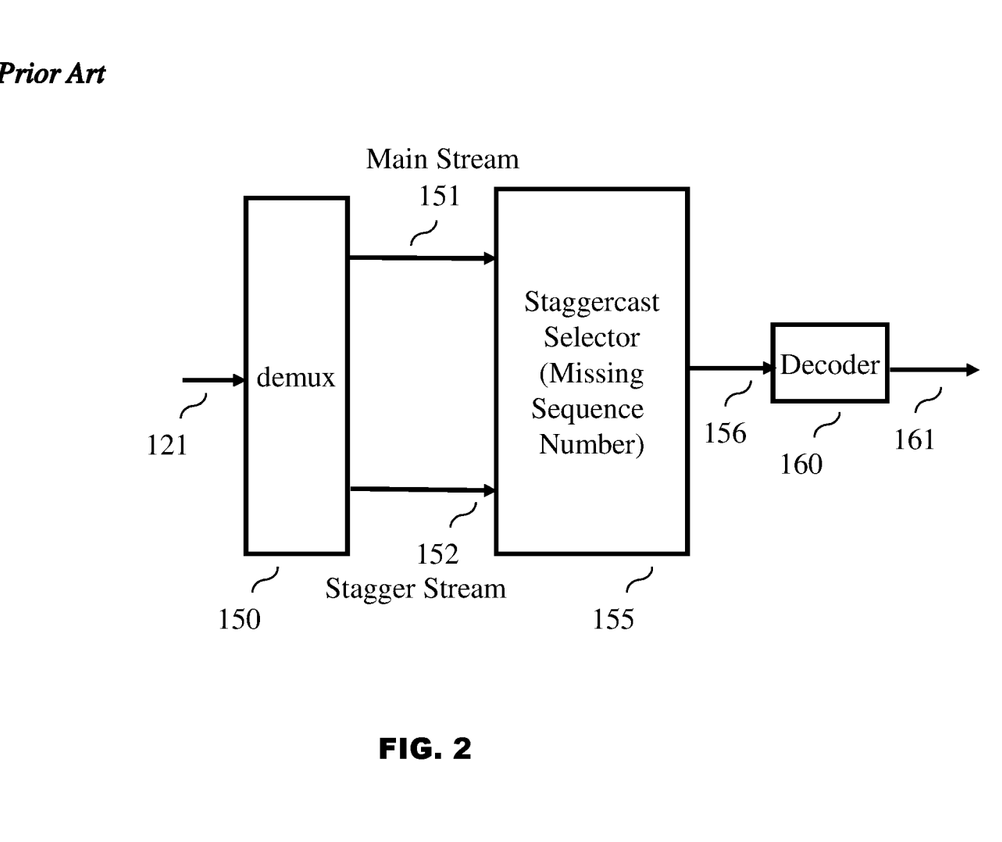
FIG. 2 illustrates a prior art receiver for use in a staggercast system.

Turning now to FIG. 2, an illustrative staggercast receiver is shown. The staggercast receiver comprises demultiplexer (demux) 150, staggercast selector 155 and decoder 160. The transmitted stream (the transmission medium, e.g., broadcast, internet, etc., is not shown in FIG. 2) is received by demux 150, which demultiplexes the received transmitted stream 121 and provides main stream 151 and stagger stream 152. Therefore, in case of loss due to physical disruptions, a correction can be made on the receiver side by staggercast selector 155 by inserting data from stagger stream 152 in the main stream 151. In particular, staggercast selector 155 detects "holes" in main stream 151 when a discontinuity is found in the sequence number of received transport packets in main stream 152. Since packets from stagger stream 152 were received earlier, staggercast selector 155 inserts the correct packet from stagger stream 152 for the missing packet in main stream 151 and provides output signal 156 to decoder 160. In this way, missing packets from main stream 151 can be replaced by using the corresponding packets received earlier from stagger stream 152. Thus, the quality of service (QoS) to the user is maintained and decoder 160 provides a decoded stream 161 (e.g., for additional processing (not shown)) for viewing by a user.

Figure 3:
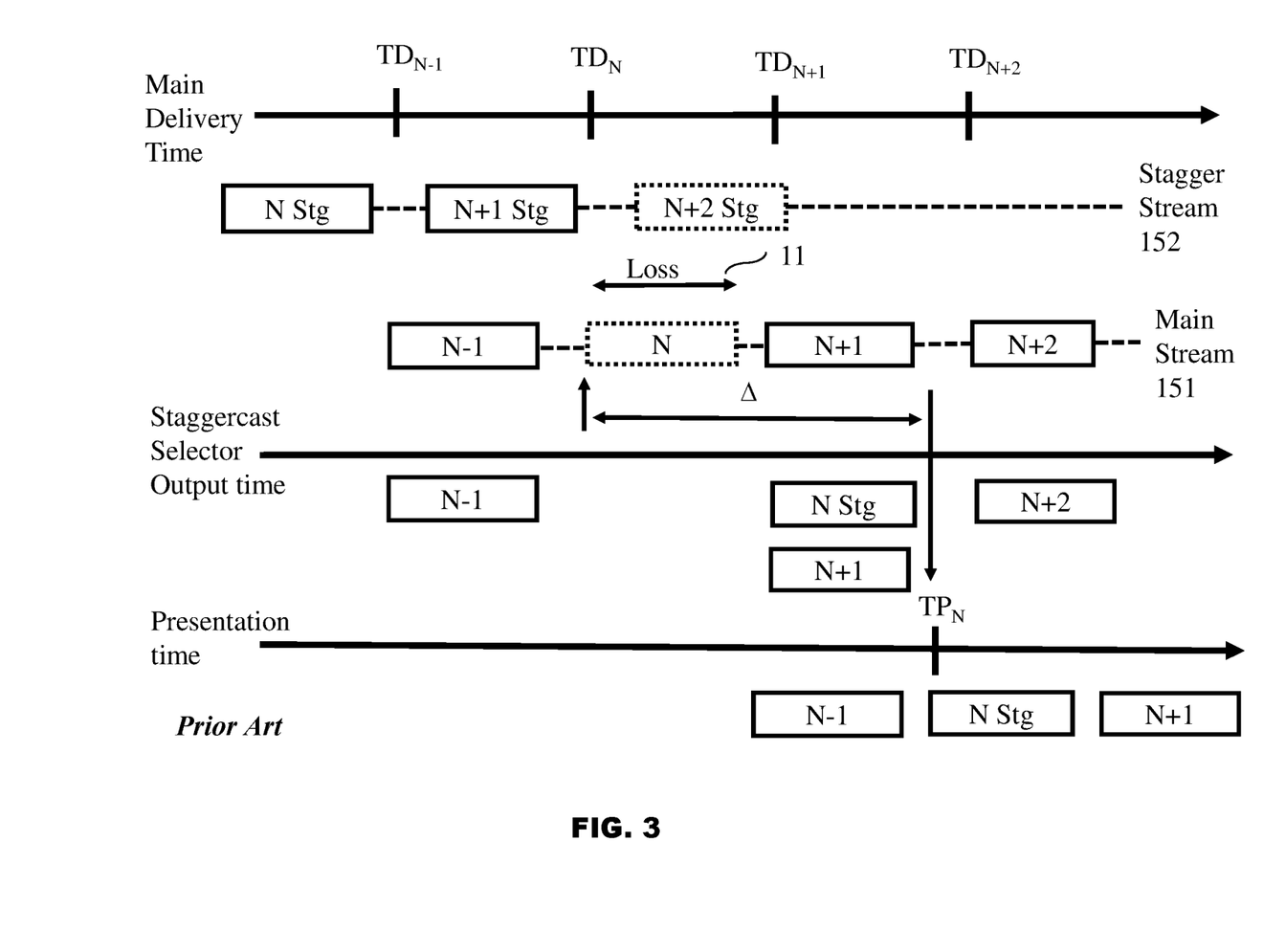
FIG. 3 shows recovery of a missing packet in a staggercast system based upon detection of a missing sequence number.

This packet loss example is further illustrated in FIG. 3. Stagger stream 152 comprises a stream of packets as represented by packets "N Stg", "N+1 Stg" and "N+2 Stg", where "N", "N+1" and "N+2" represent packet sequence numbers, and "N" is an integer value, e.g., 10. Likewise, main stream 151 comprises a stream of packets as represented by packets "N−1", "N", "N+1" and "N+2". The time of delivery (TD) for each packet in main stream 151 is also illustrated in FIG. 3. For example, the time of delivery for packet "N−1" is shown as $TD_{N-1}$ in FIG. 3, etc. Unfortunately, a loss 11 occurs such that stagger stream 152 is missing packet "N+2 Stg" (shown as a dashed line box) and main stream 151 is missing packet "N" (shown as a dashed line box). Staggercast selector 155, of FIG. 2, detects that a packet is missing from main stream 151 at $TD_{N+1}$ since the next packet received has a sequence number "N+1". As such, staggercast selector 155 pushes both the earlier received packet "N Stg" from stagger stream 152 and packet "N+1" from main stream 151 (shown below the axis "Staggercast Selector Output time") to decoder 160, of FIG. 2. The time between delivery of a packet and presentation to a user is illustrated as Δ in FIG. 3. The time of presentation (TP) to the user is shown on the bottom axis of FIG. 3. As can be observed, QoS to the user is maintained, i.e., there is no break in the decoded audio/video content since packet "N Stg" is provided in time for presentation to the user at $TP_N$. It should be observed that even though packet "N+2 Stg" was lost in stagger stream 152, since corresponding packet "N+2" was correctly received in main stream 151, this missing packet had no effect on the decoded audio/video. Unfortunately, if missing packets are not available from the stagger stream then the QoS to the user degrades. The aim is to adjust correctly the stagger delay so that packets in the stagger stream are available to replace missing packets in the main stream.

Figure 4:
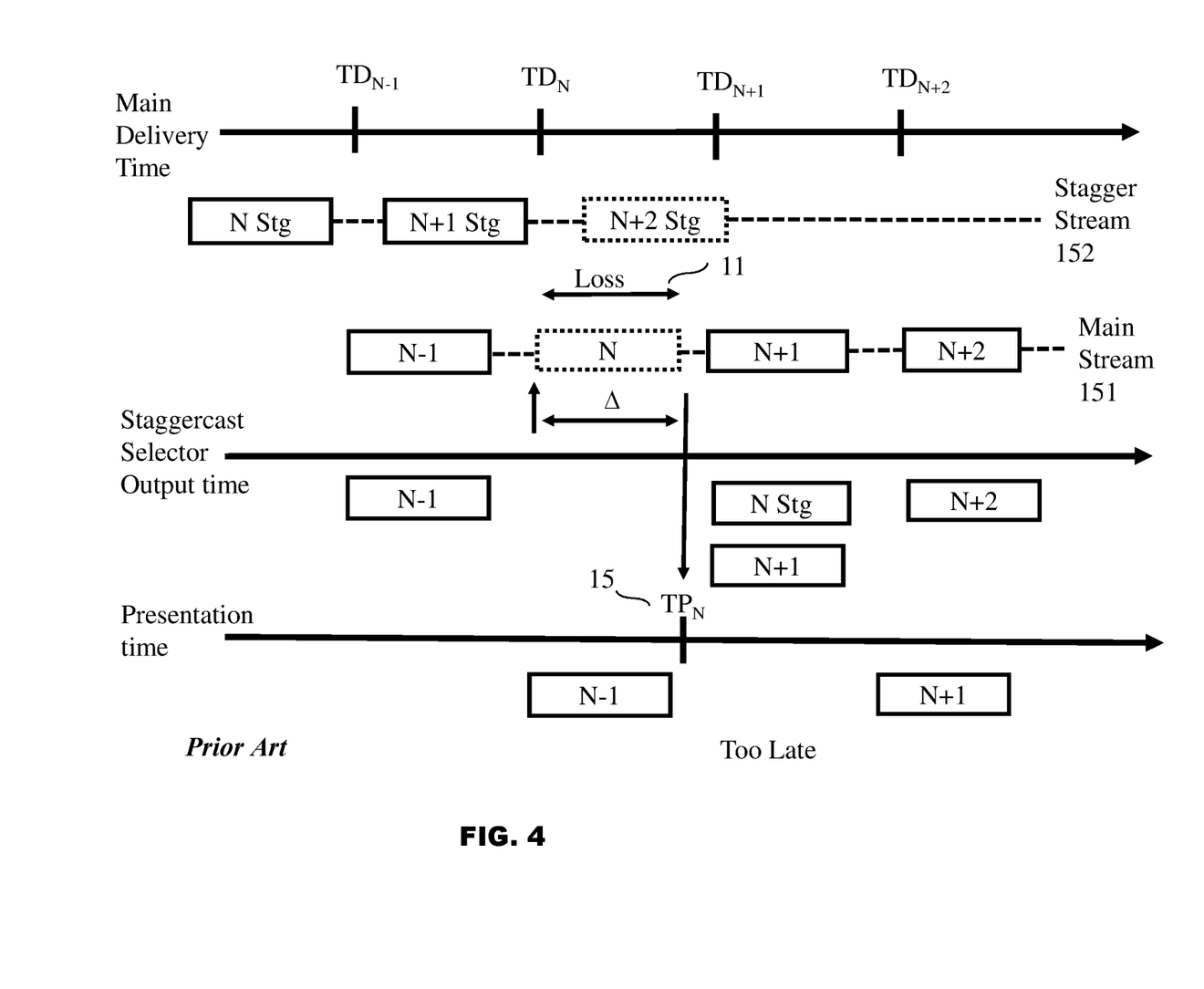
FIG. 4 illustrates a time of presentation problem in a staggercast system based upon detection of a missing sequence number.

However, even if packets are available in the staggerstream to replace missing packets in the main stream, there could still be a problem regarding the time of presentation (TP). This is illustrated in FIG. 4. The latter is similar to FIG. 3 except that the time of presentation for packet "N" is now shorter. In other words, the time of presentation for a packet is closer to the time of delivery of the packet. As such, at the time of presentation for packet "N", $TP_N$ (15), staggercast selector 155 has not yet detected that packet "N" is missing from main stream 151. As such, there is a gap in the decoded audio/video even though the corresponding packet in staggerstream 152 was available to replace the missing packet in main stream 151, this corresponding packet was provided too late.

Figure 5:
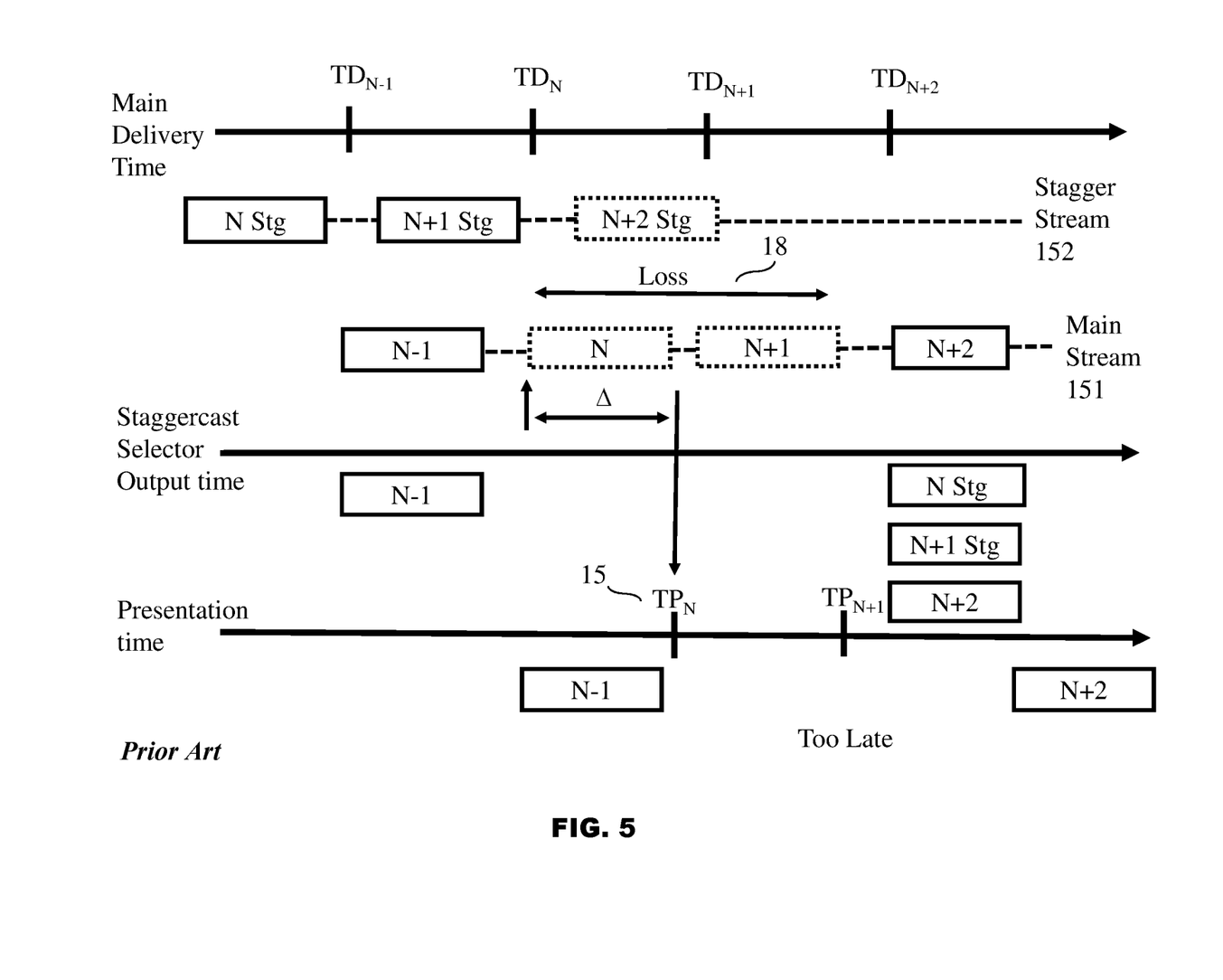
FIG. 5 illustrates another time of presentation problem in a staggercast system based upon detection of a missing sequence number.

Also if the loss is longer, the user will not benefit from stagger correction. This is illustrated in FIG. 5. The latter is similar to FIG. 4, except that loss 18 is longer and there is also a packet "N+1" missing from main stream 151. However, staggercast selector 155 does not detect the gap in sequence numbers until receiving packet "N+2" in main stream 151. At this point, staggercast selector 155 pushes packets "N Stg" and "N+1 Stg" from stagger stream 152 and packet "N+2" from main stream 151. However, the packets from stagger stream 152 are provided too late, i.e., after the time of presentation for packets "N" and "N+1", and will be discarded by the decoder at presentation time.

Figure 6:
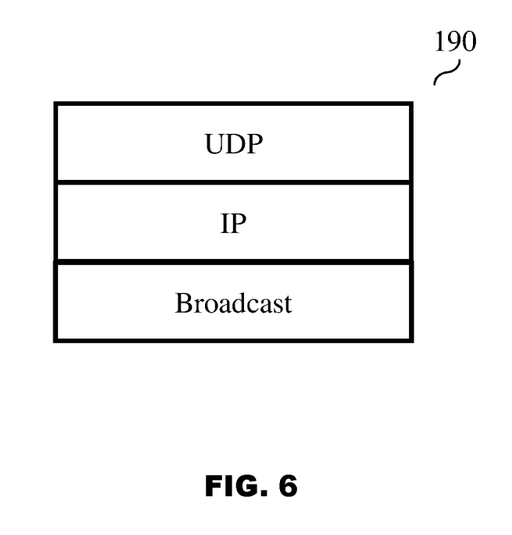
FIG. 6 shows an illustrative transport stack for use in a broadcast system.

In addition, the currently proposed ATSC 3.0 broadcast system may support staggercasting and has chosen to send content using UDP over IP packets as shown in FIG. 6. The latter shows an illustrative transport stack 190 where content is sent using UDP over IP packets over the broadcast (physical) layer. Unfortunately, there is no way in the UDP protocol itself to identify missing packets and the physical layer cannot signal loss and error to the staggercast selector as it could be done with the MPEG2 transport stream. A receiver has to detect by its own means when a corruption occurs (using IP checksum or manage by the physical layer)

or when a loss occurs (using discontinuity in transport packets sequence number for instance (as described above)).

SUMMARY OF THE INVENTION

In view of the above, there is a need to improve the power of correction of staggercast. In particular, and in accordance with the principles of the invention, a receiver estimates a delivery time of a packet from a main stream and, if the packet from the main stream is not received at the estimated delivery time, the receiver substitutes a corresponding packet from the stagger stream. As a result, a loss can be detected quicker since the receiver does not have to wait until detection of a missing sequence number and, therefore, the receiver can accommodate the time of presentation across different systems (as well as different types of transport stacks) such that the user does not suffer a loss in QoS.

In an illustrative embodiment of the invention, an Advanced Television Systems Committee Digital Television (ATSC DTV) device comprises a receiver for receiving a staggercast transmission representing content comprising at least two packet streams, wherein one packet stream is a main stream and another packet stream is a stagger stream; and a processor configured to estimate a delivery time of a packet from the main stream; and if the packet from the main stream is not received at the estimated delivery time, to substitute a corresponding packet from the received stagger stream for use in presentation of the content.

In another illustrative embodiment of the invention, an Advanced Television Systems Committee Digital Television (ATSC DTV) device performs a method comprising receiving a staggercast transmission representing content comprising at least two packet streams, wherein one packet stream is a main stream and another packet stream is a stagger stream; and estimating a delivery time of a packet from the main stream; and if the packet from the main stream is not received at the estimated delivery time, substituting a corresponding packet from the received stagger stream for use in presenting the content.

In view of the above, and as will be apparent from reading the detailed description, other embodiments and features are also possible and fall within the principles of the invention.

DETAILED DESCRIPTION

Other than the inventive concept, the elements shown in the figures are well known and will not be described in detail. For example, familiarity with television broadcasting, receivers and video encoding is assumed and is not described in detail herein. As such, other than the inventive concept, familiarity with current and proposed recommendations for television (TV) standards such as ATSC (Advanced Television Systems Committee) and Digital Video Broadcasting (DVB), e.g., Digital Video Broadcasting-Terrestrial (DVB-T2) is assumed. Further, other than the inventive concept, familiarity with protocols such as the File Delivery over Unidirectional Transport (FLUTE) protocol, User Datagram Protocol (UDP), Asynchronous Layered Coding (ALC) protocol, Internet protocol (IP) and Internet Protocol Encapsulator (IPE), is assumed and not described herein. Similarly, other than the inventive concept, formatting and encoding methods (such as Moving Picture Expert Group (MPEG)-2 Systems Standard (ISO/IEC 13818-1)) for generating transport bit streams are well-known and not described herein. It should also be noted that the inventive concept may be implemented using conventional programming techniques, which, as such, will not be described herein. Finally, like-numbers on the figures represent similar elements.

As noted earlier, there is a need to improve the power of correction of staggercast. In particular, and in accordance with the principles of the invention, a receiver estimates a delivery time of a packet from a main stream and, if the packet from the main stream is not received at the estimated delivery time, the receiver substitutes a corresponding packet from the stagger stream. As a result, a loss can be detected quicker since the receiver does not have to wait until detection of a missing sequence number and, therefore, the receiver can accommodate the time of presentation across different systems (as well as different types of transport stacks) such that the user does not suffer a loss in QoS.

Figure 7:
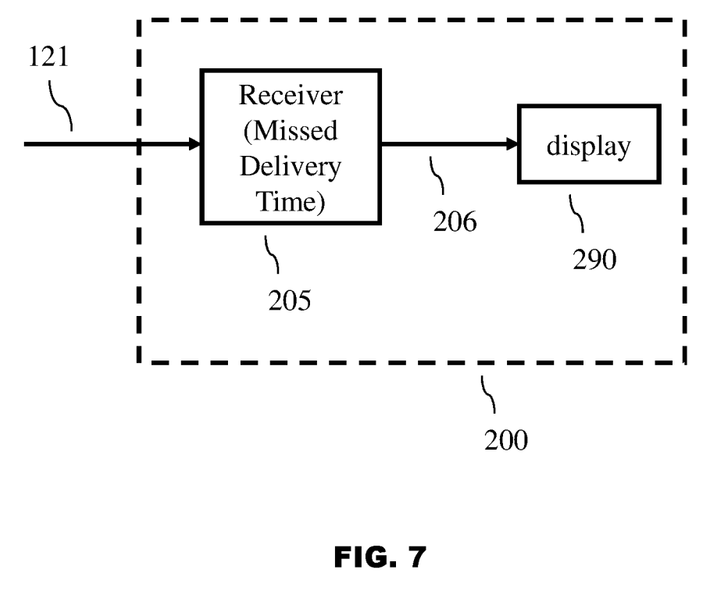
FIG. 7 shows an illustrative embodiment of a device in accordance with the principles of the invention.

Referring now to FIG. 7, an illustrative embodiment of a device 200 in accordance with the principles of the invention is shown. Device 200 is representative of any processor-based platform, whether hand-held, mobile or stationary. For example, a PC, a server, a set-top box, a personal digital assistant (PDA), a cellular telephone, a mobile digital television (DTV), a DTV, etc. In this regard, device 200 includes one, or more, processors with associated memory (not shown). Device 200 includes a receiver 205 and a display 290. Receiver 205 receives a transmitted signal 121 (the transmission medium, e.g., broadcast, internet, etc., is not shown In FIG. 7) that uses staggercasting for processing to recover therefrom, e.g., a video signal 206 for application to display 290 for viewing video content thereon. In accordance with the principles of the invention, receiver 205 detects possible missing packets based on missed delivery times.

Figure 8:
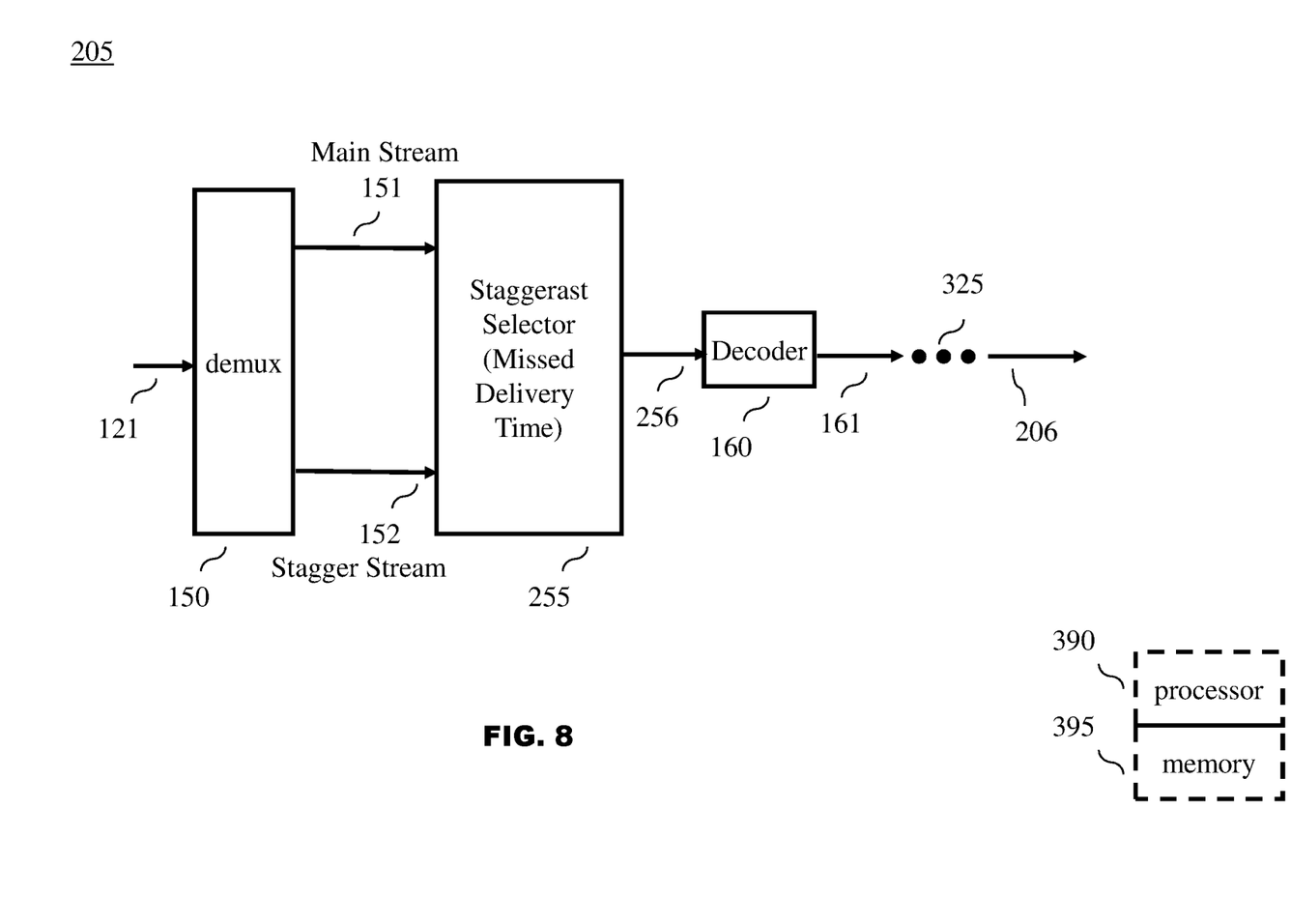
FIG. 8 shows an illustrative embodiment of a receiver in accordance with the principles of the invention.

Turning now to receiver 205, an illustrative portion of receiver 205 in accordance with the principles of the invention is shown in FIG. 8. Only those portions relevant to the inventive concept are shown. Receiver 205 is a processor-based system and includes one, or more, processors and associated memory as represented by processor 390 and memory 395 shown in the form of dashed boxes in FIG. 8. In this context, computer programs, or software, are stored in memory 395 for execution by processor 390 and, e.g., implement staggercast selector 255. Processor 390 is representative of one, or more, stored-program control processors and these do not have to be dedicated to the receiver function, e.g., processor 390 may also control other functions of receiver 205. Memory 395 is representative of any storage device, e.g., random-access memory (RAM), read-only memory (ROM), etc.; may be internal and/or external to receiver 205; and is volatile and/or non-volatile as necessary.

Receiver 205 comprises demultiplexer (demux) 150, staggercast selector 255 and decoder 160. Only those portions relevant to the inventive concept are shown. The transmitted stream (the transmission medium, e.g., broadcast, internet, etc., is not shown in FIG. 8) is received by demux 150, which demultiplexes the received transmitted stream 121 and provides main stream 151 and stagger stream 152. Therefore, in case of loss due to physical disruptions, a correction can be made on the receiver side by staggercast selector 255 by inserting data from stagger stream 152 in the main stream 151. In particular, and in accordance with the principles of the invention, staggercast selector 255 estimates a delivery time of a packet from a main stream and, if the packet from the main stream is not received at the estimated delivery time, the receiver substitutes a corresponding packet from the stagger stream (described further below). Since packets from stagger stream 152 were received earlier, staggercast selector 255 inserts the correct packet from stagger stream 152 for the missing packet in main stream 151 and provides output signal 256 to decoder 160. The latter provides a decoded stream 161, which is processed by other circuitry (not shown) of receiver 205 as represented by ellipses 325 to recover therefrom, e.g., a video signal 206 for presentation to a user via display 290 of FIG. 7. As a result, a possible loss can be detected quicker since the receiver does not have to wait until detection of a missing sequence number and, therefore, the receiver can accommodate the time of presentation across different systems (as well as different types of transport stacks) such that the user does not suffer a loss in QoS.

Figure 9:
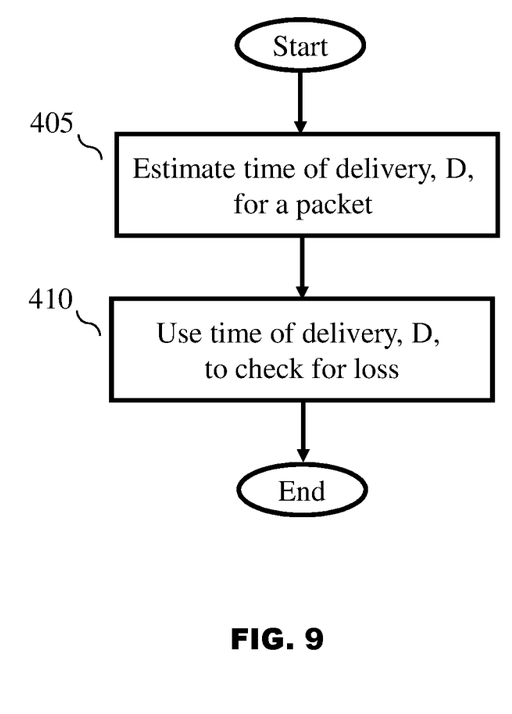
FIG. 9 shows an illustrative flow chart for use in a receiver in accordance with the principles of the invention.
Figure 10:
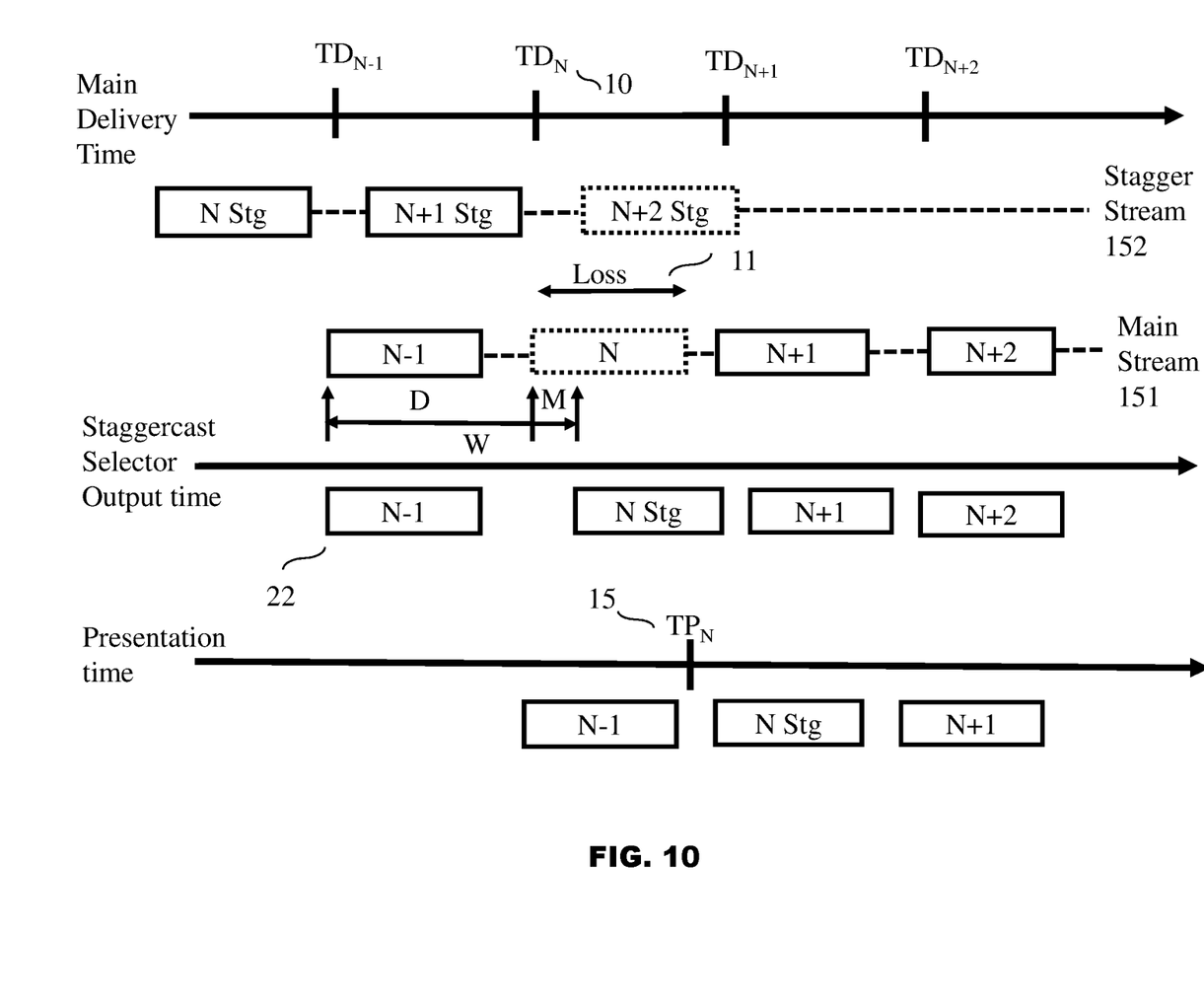
FIG. 10 shows recovery of a missing packet in a staggercast system in accordance with the principles of the invention.

Referring now to FIG. 9, an illustrative flow chart for use in receiver 205 in accordance with the principles of the invention is shown. In step 405, staggercast selector 255 estimates the delivery time of a packet as a function of the actual delivery time of two contiguous packets. Either the stagger stream 252 or the main stream 151 can be used. For example, with reference to FIG. 10, packets "N Stg" and "N+1 Stg" in stagger stream 152 can be used to estimate a delivery time for the next packet since both these packets were received. In this example, the estimated delivery time is:

$$D = TD_{N+1\ Stg} - TD_{N\ Stg} \tag{1}$$

where $TD_{N+1\ Stg}$ and "$TD_{N\ STG}$" are the times of delivery for the respective staggercasting packets. It should be noted that although $TD_{N+1\ STG}$ and $TD_{N\ STG}$ are not explicitly shown in FIG. 10, their positions in stagger stream 152 are shown, and, as such, their times of delivery are also shown. Returning to FIG. 9, staggercast selector 255 then uses the time of delivery, D, to check for loss in step 410. It should be noted that step 405 can be performed continuously, periodically, etc. The point of step 405 is that an estimate of time of delivery, D, is determined for use in checking for loss as represented by step 410. Further, although equation (1) represents a simple subtraction, other methods, e.g., using statistics, such as averaging over a number of received packets can be used. It should also be noted that if staggercast selector 255 cannot determine a time of delivery, D, for a particular execution of step 405, then either a previously determined value can continue to be used, or a default value for D can be used. In fact, other methods for determining a time of delivery, D, can be used such as, but not limited to, simply using the stagger delay D.

Figure 11:
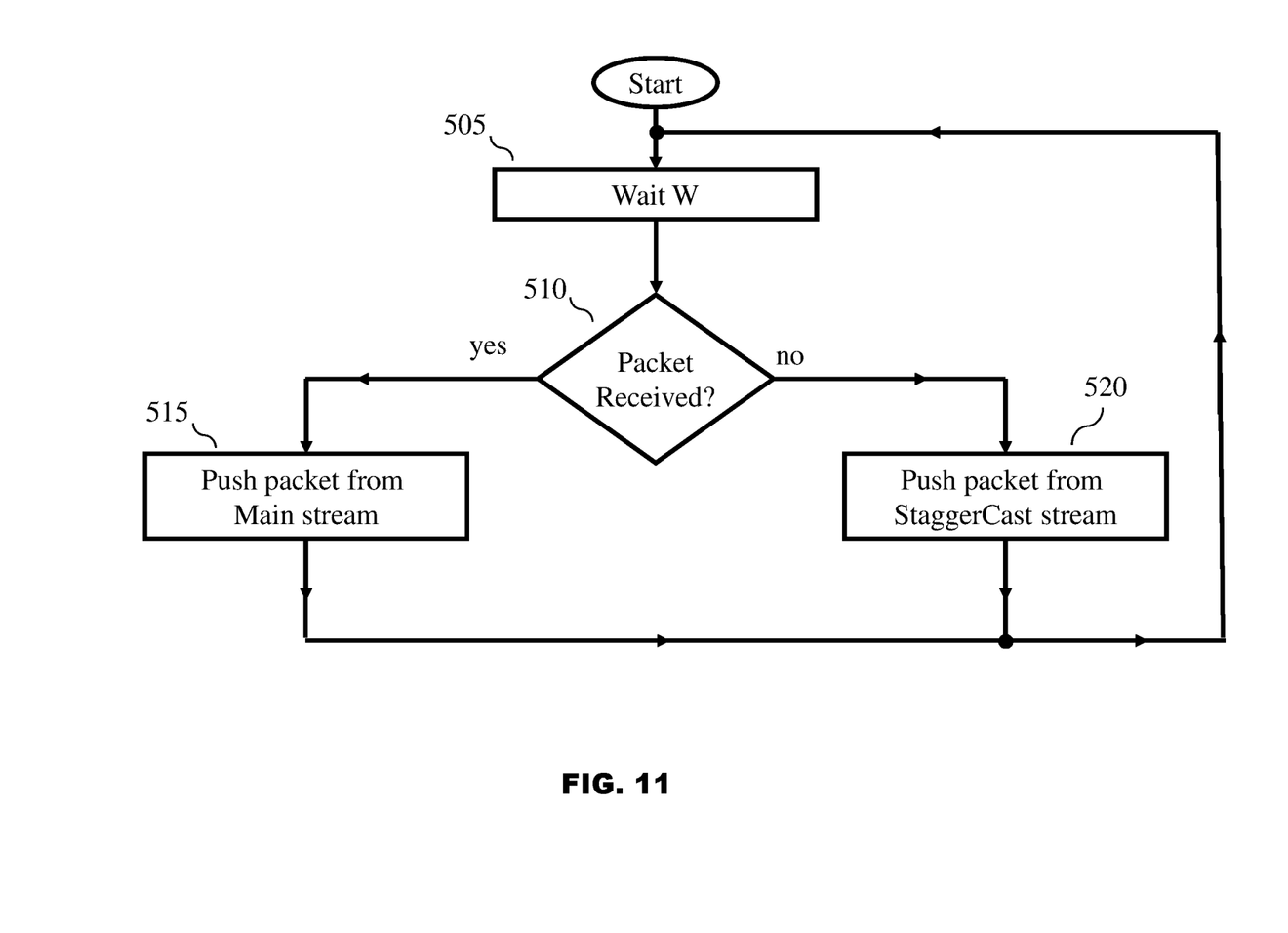
FIG. 11 shows an illustrative flow chart for use in a receiver in accordance with the principles of the invention.

Turning now to FIG. 11, an illustrative flow chart for using the estimate of time of delivery, D, to check for loss is shown. After pushing the latest packet (here represented by packet "N−1" (22) in FIG. 10), staggercast selector 255 waits a wait time "W" in step 505 from the time of delivery of the latest packet to determine if there is a loss in the packet stream. In this example, the wait time, W, is determined by:

$$W = D + M \tag{2}$$

where D is the estimated time of delivery (determined as described above for the flow chart in FIG. 9) and M is a margin, which allows a chance to still receive the packet N on the main stream. However, M could be set to zero. The wait time, W, is illustratively shown in FIG. 10 just above the "Staggercast Selector Output time" axis. After the wait time, W, has passed from $TD_{N-1}$, which is the time of delivery for the latest received packet, staggercast selector 255 checks at time "$TD_{N-1}+W$" if the packet, in this example, "N", was received in step 510. If the packet "N", from the main stream 151, was received, the staggercast selector 255 pushes the packet "N" from main stream 151 in step 515. However, if the packet "N", from the main stream 151, was not received, the staggercast selector 255 pushes the packet "N STG" from stagger stream 152 in step 520. This is illustrated in FIG. 10, where the loss of packet "N" is now assumed after the expiration of the wait time, W, since packet "N" from the main stream has not been received (as represented by the dashed line box) and, as illustrated in FIG. 10 under the "Staggercast selector Output time" axis, packet "N Stg" from stagger stream 152 is pushed ahead of the required presentation time, $TP_N$ (15), for packet "N". As such, and in accordance with the principles of the invention, a loss can be detected quicker since the receiver does not have to wait until detection of a missing sequence number and, therefore, the receiver can accommodate the time of presentation across different systems (as well as different types of transport stacks) such that the user does not suffer a loss in QoS.

In the same manner, if the loss is longer, e.g., as shown in FIG. 5, where, packets "N" and "N+1" from the main stream 151 are lost, staggercast selector 255 can use the same approach for the following packet "N+1". In this case, $T_{DN}$ is simply provided by ($T_{DN-1}+D$) and staggercast selector 255 will wait for the wait time, W, to expire to determine if there is a loss at time ($T_{DN}+W$) for packet "N+1" in the same fashion as described with respect to packet "N" for FIG. 11.

In view of the above, the foregoing merely illustrates the principles of the invention apply to any staggercasting-based system and it will thus be appreciated that those skilled in the art will be able to devise numerous alternative arrangements which, although not explicitly described herein, embody the principles of the invention and are within its scope. For example, although illustrated in the context of a staggercast selector determining the time estimate, this could be determined by another part of the receiver either structurally or in a different portion of executed software. In addition, although illustrated in the context of separate functional elements, these functional elements may be embodied in one or more integrated circuits (ICs). Similarly, although shown as separate elements, any or all of the elements may be implemented in a stored-program-controlled processor, e.g., a digital signal processor, which executes associated software, e.g., corresponding to one or more of the steps shown in, e.g., FIGS. 9 and 11, etc. Further, although some of the figures may suggest the elements are bundled together, the inventive concept is not so limited, e.g., the elements of device 200 of FIG. 7 may be distributed in different units in any combination thereof. For example, receiver 205 of FIG. 7 may be a part of a device, or box, such as a set-top box that is physically separate from the device, or box, incorporating display 290, etc. It is therefore to be understood that numerous modifications may be made to the illustrative embodiments and that other arrangements may be devised without departing from the scope of the present invention as defined by the appended claims.

The invention claimed is:

1. A method for use in a staggercasting receiver, comprising:
    receiving a staggercast content comprising at least two packet streams, wherein one packet stream is a main stream, used in presenting the content and another packet stream is a stagger stream, the stagger stream being received before the main stream;
    estimating a delivery time of a packet from the main stream as a function of delivery times of two contiguous packets respectively, comprising a first and a second sequence number, the second sequence number being the first sequence number incremented by one; and
    if the packet from the main stream is not received at the estimated delivery time, substituting, at the estimated delivery time, a corresponding packet from the received stagger stream.

2. The method of claim 1, wherein the estimated time of delivery uses a value determined by subtracting said delivery times of two contiguous packets.

3. The method of claim 2, wherein the two contiguous packets are both in either the main stream or the stagger stream.

4. The method of claim 2, wherein the estimated time of delivery includes the addition of a wait time.

5. The method of claim 2, wherein the value is determined by averaging a number of subtractions.

6. The method of claim 2, wherein the value is a function of a stagger cast delay.

7. The method of claim 1, wherein the receiving step includes demultiplexing the received staggercast content for providing the main stream and the stagger stream.

8. An apparatus comprising:
    a receiver for receiving a staggercast content comprising at least two packet streams, wherein one packet stream is a main stream, used in presenting the content and another packet stream is a stagger stream, the stagger stream being received before the main stream; and
    a processor configured to estimate a delivery time of a packet from the main stream as a function of delivery times of two contiguous packets respectively, comprising a first and a second sequence number, the second sequence number being the first sequence number incremented by one; and
    if the packet from the main stream is not received at the estimated delivery time, to substitute, at the estimated delivery time, a corresponding packet from the received stagger.

9. The apparatus of claim 8, wherein the estimated time of delivery uses a value determined by subtracting said delivery times of the two contiguous packets.

10. The apparatus of claim 9, wherein the two contiguous packets are both in either the main stream or the stagger stream.

11. The apparatus of claim 9, wherein the estimated time of delivery includes the addition of a wait time.

12. The apparatus of claim 9, wherein the value is determined by averaging a number of subtractions.

13. The apparatus of claim 9, wherein the value is a function of a stagger cast delay.

14. The apparatus of claim 8, wherein the receiver comprises a demultiplexer for demultiplexing the received staggercast content for providing the main stream and the stagger stream.

15. The apparatus of claim 8, wherein the processor represents a staggercast selector for selecting packets between the main stream and the stagger stream for presentation.

16. A method for use in a staggercasting receiver, comprising:
    receiving a staggercast content comprising at least two packet streams, wherein one packet stream is a main stream, used in presenting the content and another packet stream is a stagger stream, the stagger stream being received before the main stream;
    estimating a delivery time of a packet from the main stream as a function of delivery times of two contiguous packets respectively, comprising a first and a second sequence number, the second sequence number being the first sequence number incremented by one;
    determining, at the estimated delivery time, that the packet from the main stream is not received at the estimated delivery time; and
    substituting, a corresponding packet from the received stagger stream.

17. The method of claim 16, wherein the estimated time of delivery uses a value determined by subtracting said delivery times of two contiguous packets.

18. The method of claim 17, wherein the two contiguous packets are both in either the main stream or the stagger stream.

19. The method of claim 17, wherein the estimated time of delivery includes the addition of a wait time.

20. The method of claim 16, wherein receiving the staggercast content includes demultiplexing the received staggercast content for providing the main stream and the stagger stream.

* * * * *